United States Patent
Purdy et al.

(10) Patent No.: US 7,571,196 B2
(45) Date of Patent: Aug. 4, 2009

(54) TYPE EVOLUTION

(75) Inventors: Douglas Purdy, Carnation, WA (US); Natasha Jethanandani, Redmond, WA (US); Sowmy Srinivasan, Redmond, WA (US); Stefan H. Pharies, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 327 days.

(21) Appl. No.: 10/815,242

(22) Filed: Mar. 31, 2004

(65) Prior Publication Data

US 2005/0235009 A1    Oct. 20, 2005

(51) Int. Cl.
G06F 17/30 (2006.01)
G06F 17/00 (2006.01)

(52) U.S. Cl. ................ 707/203; 707/101

(58) Field of Classification Search .......... 707/1–10, 707/100–104.1, 200–205; 717/500–515
See application file for complete search history.

(56) References Cited

U.S. PATENT DOCUMENTS

| | | | |
|---|---|---|---|
| 5,278,979 A | 1/1994 | Foster et al. | |
| 5,881,292 A | 3/1999 | Sigal et al. | |
| 6,209,128 B1 | 3/2001 | Gerard et al. | |
| 6,314,562 B1 | 11/2001 | Biggerstaff | |
| 6,904,454 B2 * | 6/2005 | Stickler | 709/213 |
| 2003/0018661 A1 * | 1/2003 | Darugar | 707/500 |
| 2003/0088593 A1 * | 5/2003 | Stickler | 707/205 |
| 2003/0097365 A1 * | 5/2003 | Stickler | 707/100 |
| 2003/0149934 A1 * | 8/2003 | Worden | 715/513 |
| 2004/0024117 A1 * | 2/2004 | Bae et al. | 715/523 |

OTHER PUBLICATIONS

Delinchant, et al., "Concurrent Design Versioning Systems, Based on XML File," IEEE 28th Annual Conference of the IEEE Industrial Electronics Society, vol. 3, pp. 2485-2490, Nov. 2002.
Speck et al., "Versioning in Software Engineering", IECON'01 27th Annual Conference of the IEEE Industrial Electronics Society, vol. 3, pp. 1856-1861, Nov.-Dec. 2001.
Franconi, et al., "Schema Evolution and Versioning: A Logical and Computational Characterisation", Database Schema Evolution and Meta-Modeling 9th International Workshop on Foundations of Models and Languages for Data and Objects, Lecture Notes in Computer Science vol. 2065, pp.
Chien, et al., "XML Document Versioning", SIGMOD, vol. 30, No. 3, pp. 46-53, Sep. 2001.
Roddick, et al., "Beyond Schema Versioning: A Flexible Model for Spatio-Temporal Schema Selection", GeoInformatica, vol. 5 No. 1, pp. 33-50, Mar. 2001.
David Orchard, "Providing Compatible Schema Evolution", www.pacificspirit.com/authoring/compatibility/providingcompatibleschemaevolution, pp. 1 of 15, Jan. 2004.

* cited by examiner

Primary Examiner—Hosain T Alam
Assistant Examiner—Navneet K Ahluwalia
(74) Attorney, Agent, or Firm—Lee & Hayes, PLLC

(57) ABSTRACT

A versionable schema is both backward-compatible and forward-compatible. Such a schema is able to receive data expected by multiple versions of the schema; tolerates the absence of optional data, in accordance with other versions, and accept wildcard data in accordance with still further versions. Thus, a message or message may be validated by the versionable schema.

30 Claims, 5 Drawing Sheets

```
<xs:sequence minOccurs = "0" maxOccurs = "1">
    <xs:element ref="beginLocal" minOccurs = "1" maxOccurs = "1" />
    <xs:element name="v2LocalField" type="xs:int" />
    <xs:sequence minOccurs="0" maxOccurs="unbounded"/>
        <xs:element ref ="beginLocal" minOccurs = "1" maxOccurs = "1" />
        <xs:any namespace = "##targetNamespace ##local" minOccurs="0" maxOccurs= "unbounded"/>
    </xs:sequence>
    <xs:element ref="endLocal" minOccurs = "1" maxOccurs = "1" />
</xs:sequence>
<xs:sequence minOccurs = "0" maxOccurs = "1">
    <xs:element name="beginGlobal" minOccurs = "1" maxOccurs = "1" />
    <xs:element ref="v2GlobalField"/>
    <xs:sequence minOccurs="0" maxOccurs="unbounded"/>
        <xs:element name="beginGlobal" minOccurs = "1" maxOccurs = "1" />
        <xs:any namespace = "##other" minOccurs="0" maxOccurs= "unbounded"/>
    </xs:sequence>
    <xs:element name="endGlobal" minOccurs = "1" maxOccurs = "1" />
</xs:sequence>
```

305

306

TYPE EVOLUTION

FIELD

The present invention is directed to the interoperability of evolving types.

BACKGROUND

Type evolution, also referred to as the versioning of types, is an important aspect of a distributed environment or service oriented architecture (SOA).

Typically, an exchange of messages between two end points, such as between a server device and a client device, requires that the end points agree upon a format for the messages. A message format may otherwise be referred to as a "data structure" or a "type," and these terms may be used interchangeably throughout this description.

A type is typically described in a neutral language, a non-limiting example of which is XML Schema. Extensible Markup Language (XML) is a meta-markup language that provides a format for describing structured data. XML is a tag-based language and, by virtue of its tag-based nature, defines a strict tree structure or hierarchy. XML is a general-purpose language for representing structured data without including information that describes how to format the data for display.

XML accommodates an immeasurable number of schemas. A schema is a set of rules for constraining the structure and articulating the information set of XML messages. A "message" is formatted text, and "schema" describes the data structures, shape, and content of XML messages that are valid for a given application. As schemas evolve, data exchanges between different end points, in the form of requests and responses are compromised. For instance, a server using a current generation of a schema may receive a request to validate a message, information, or an action from a client using a previous generation or version of the same schema, or vice-versa. The schemas used by the server and the client must be compatible with each other in order for the message, information, or action to be validated.

More particularly, for type programmers, it is expected that their types would evolve over time to add new features, delete old features, or fix bugs in existing features. Unfortunately, the interoperability of cross-generational types is uncertain without specifically programming a type to be backward-compatible or forward compatible. A backward-compatible type is able to validate messages using received data that is formatted in accordance with a previous version of the type. A forward compatible type is able to validate messages using received data that is formatted in accordance with a subsequent version of the type.

SUMMARY

Described herein are versionable types, as well as methods and means for rendering multiple generations of a type compatible with one another.

A versionable type includes an optional data member that tolerates the absence of optional data in order to validate a message. That is, a message may be validated by the versionable type despite an absent element in the optional data member. The versionable type further includes a construct that is delimited from the optional data member, which is able to accept data that is associated with another version of the type rather than a current version of the type. Thus, a message may be validated by a versionable type despite a wildcard data element in the message.

BRIEF DESCRIPTION OF THE DRAWINGS

The detailed description is described with reference to the accompanying figures.

FIG. 3C shows an example of specific elements, further to the examples of FIGS. 3A and 3B.

DETAILED DESCRIPTION

The following description is directed to techniques for rendering different generations of types compatible with each other. More particularly, for devices such as a server device and a client device that agree upon a type before exchanging messages, the example embodiments enable the type to evolve at one or more of the end points without adversely affecting the exchange of messages at either of the end points.

With regard to the agreement for the messages referenced above, the term "message" is used within this description to refer to a formatted message. In addition, the description may interchangeably utilize the terms "type," "schema," and "format." These terms may refer to an arrangement of data within a message file that enables a message to be encoded or decoded in a valid manner. More particularly, each of a "type," "schema," and "format" may refer to specifically arranged data members to validate a message file to be transmitted to a receiving node, or to validate a message received from a sending node. Thus, all three terms pertain to the structuring of data that is exchanged between devices including, but not limited to, a server device and a client device.

Further still, with regard to types, schemas, and formats, the description may reference "first" or "second" versions or different generations thereof. The qualifiers "first" and "second" are intended merely to distinguish different versions of a particular type, schema, or format; and are not intended to imply any sequence or order of the versions or generations thereof. For example, a second type may be a subsequent version of a first type, or it may be a preceding version of the first type. Similarly, the second type may be the immediately subsequent version of the first type, or it may succeed the first type by more than one generation; the second type may also be the immediately preceding version of the first type, or it may precede the first type by more than one generation.

Figure 1:
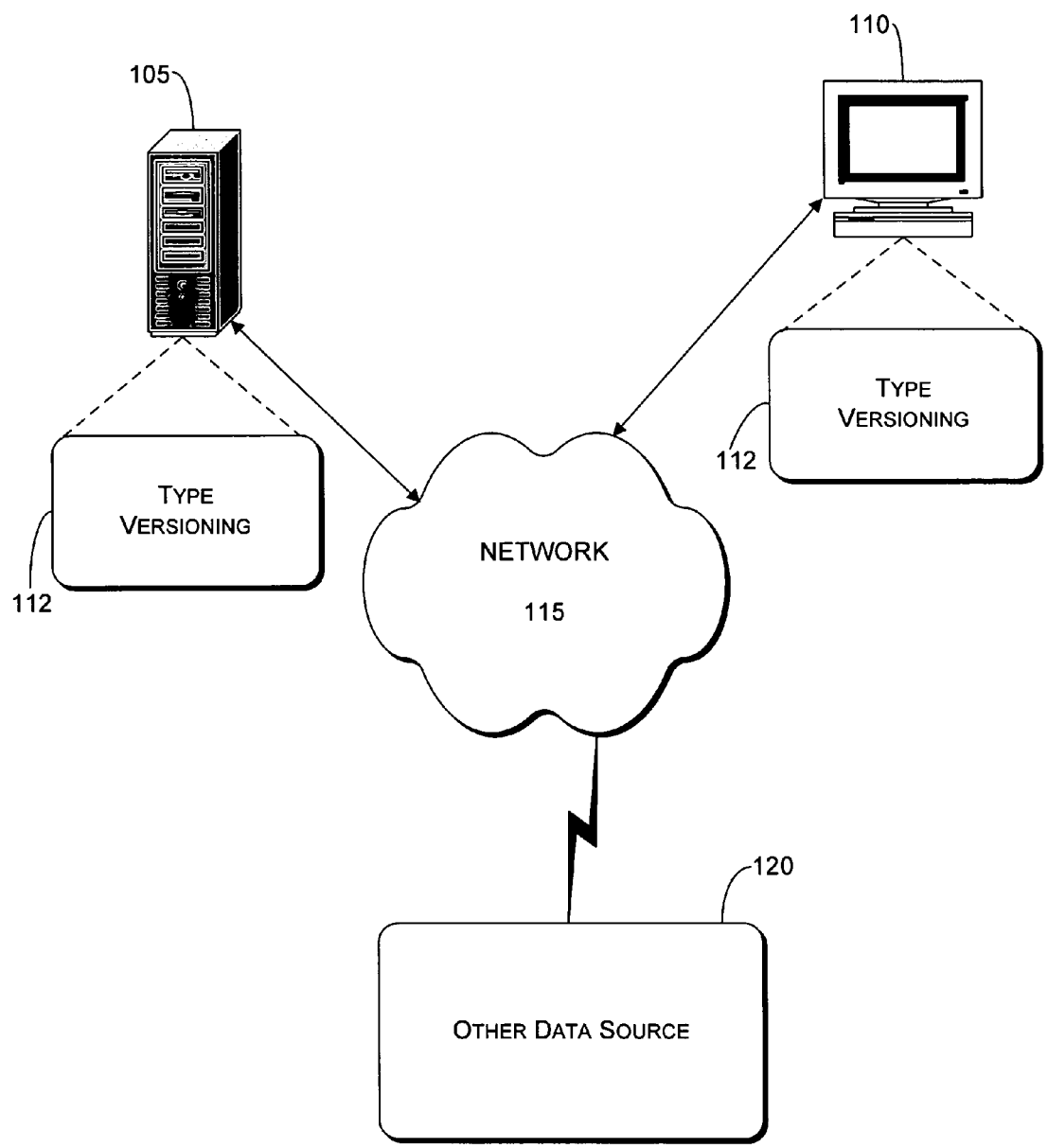
FIG. 1 shows devices communicating over a network, with the devices implementing technologies for versioning types according to an example embodiment.

FIG. 1 shows server device 105 and client device 110 that are capable of type versioning 112 in accordance with the example embodiments described herein. Server device 105, client device 110, and other data source 120, which may also be capable of type versioning, are communicatively coupled through network 115.

Server device 105 may provide any of a variety of data and/or functionality to client device 110. The data may be publicly available or alternatively restricted, e.g., restricted to only certain users or available only if an appropriate fee is paid. Server device 105 is at least one of a network server, an application server, a web blade, or any combination thereof. Other data source 120 may also be embodied by any of the above examples of server device 105. An example embodiment of server device 105 is described in further detail below with reference to FIG. 4.

Client device 110 may include any of a variety of conventional computing devices, including a desktop personal computer (PC), workstation, mainframe computer, Internet appliance, and gaming console. Further, client device 110 may be any device capable of being associated with network 115 by a wired and/or wireless link, including a personal digital assistant (PDA), laptop computer, cellular telephone, etc. Further still, client device 110 may include the client devices described above in various quantities and/or combinations thereof. Other data source 120 may also be embodied by any of the above examples of client device 110. An example embodiment of client device 110 is also described in further detail below with reference to FIG. 4.

Network 115 is intended to represent any of a variety of conventional network topologies, which may include any wired and/or wireless network. Network 115 may further utilize any of a variety of conventional network protocols, including public and/or proprietary protocols. For example, network 115 may include the Internet, an intranet, or at least portions of one or more local area networks (LANs).

Typically, server device 105 includes any device that is the source of content, and client device 110 includes any device that receives such content either via network 115 or in an off-line manner. However, according to the example embodiments described herein, server device 105 and client device 110 may interchangeably be a sending host or receiving host. For the purpose of describing the example embodiments in FIGS. 2-4, the description of which is not intended to be limiting in any manner, server device 105 is a sending host and client device 110 is a receiving host. That is, for explanatory purposes only, sending host 105 transmits data that is formatted in accordance with a first type and receiving host 110 validates a message by encoding the received data in accordance with a second, versioned type.

Figure 2:
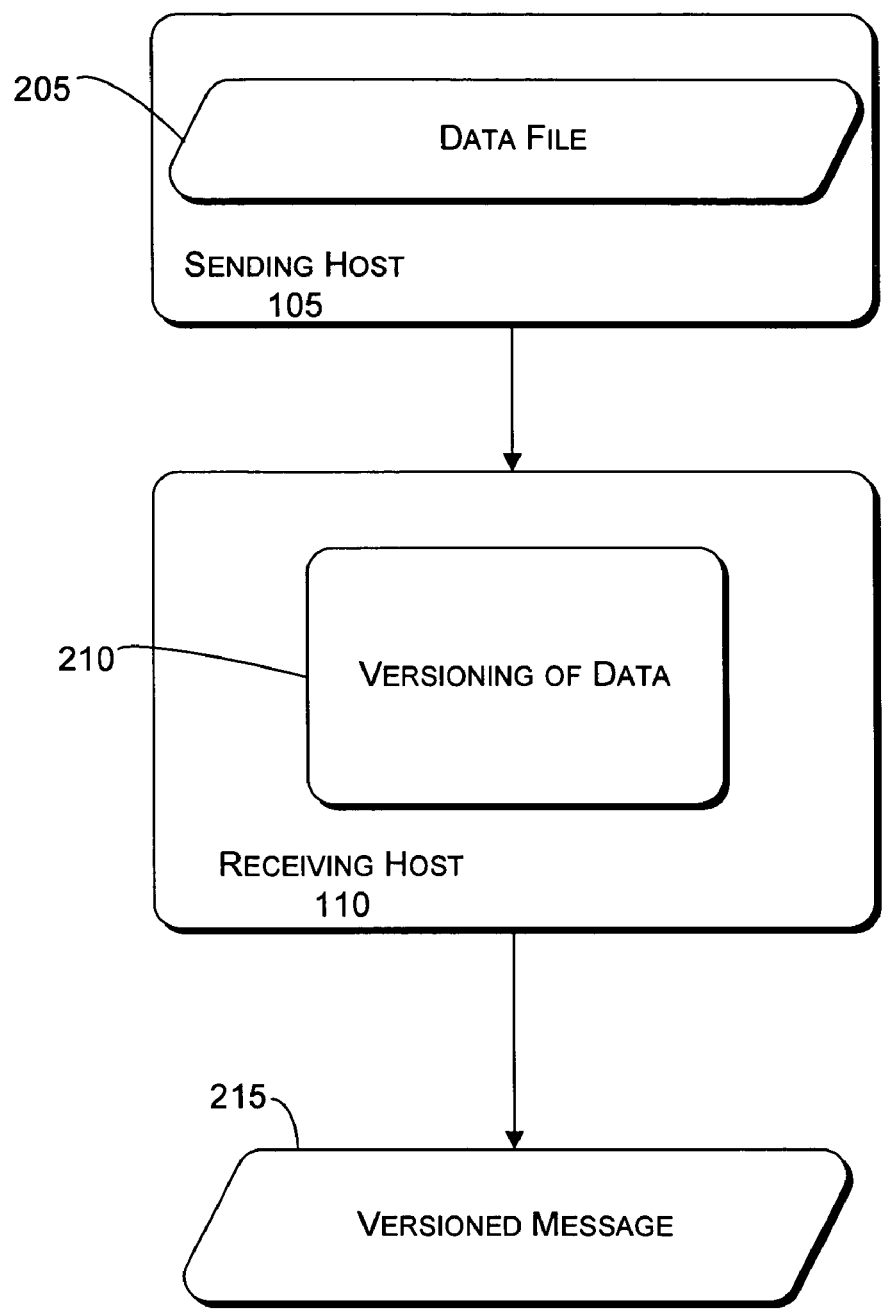
FIG. 2 shows an example embodiment of a processing flow for versioning types.

FIG. 2 shows an example embodiment of a processing flow for versioning types. More particularly, the processing of FIG. 2 renders data functional from one type to another, or, in other words, from the first type to the second type. Versioning of types may be utilized for exchanging text, electronic messages, web-posts, etc., between server device and client device 110, which utilize different types for validating messages.

According to FIG. 2, message file 205 is transmitted from sending host 105 to receiving host 110. Message file 205 is an encoded data file by which a message is to be validated at receiving host 110. Typically, such transmission of message file 205 is conducted over network 115, although the present example may also accommodate off-line transmission of message file 205.

In the example, message file 205 is encoded according to a first type at sending host 105. The example is directed towards overcoming compatibility issues that may arise when receiving host 110 receives message file 205, and attempts to use it for validating a message in accordance with a second type, which is a different version, i.e., different generation, of the first type.

In particular, as will be explained below in more detail with regard to FIGS. 3A and 3B, to validate versioned message 215, message file 205 is formatted in accordance with the second type at receiving host 110. The versioning 210 of data is enabled regardless of whether message file 205 is encoded in accordance with a first type that is an earlier, later, or concurrent version of the second type at receiving host 110. Further, the second type is able to validate versioned message 215 regardless of whether the first type precedes or succeeds the second type by one or more generation. In other words, the versioning 210 of data is enabled because the second type at receiving host 110 is simultaneously backward compatible and forward compatible.

Figures 3A, 3B:
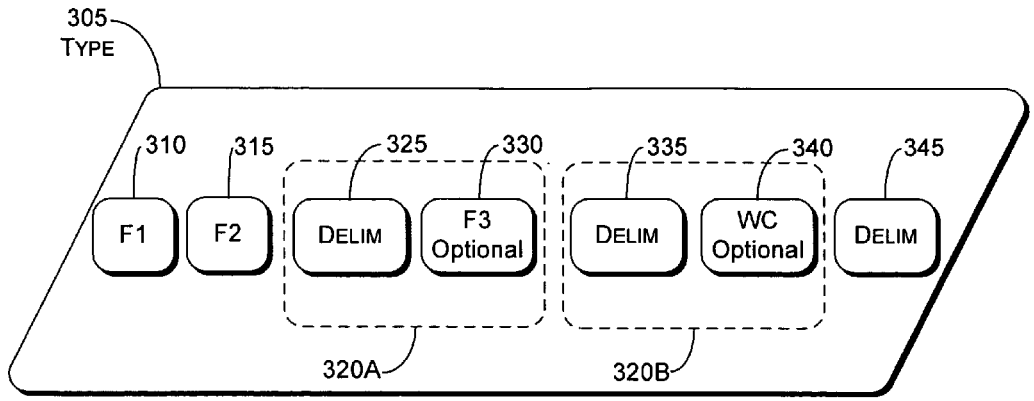
FIG. 3A shows a type according to an example embodiment.
FIG. 3B shows an example of specific elements, further to the example of FIG. 3A.

FIG. 3A shows an example embodiment of the aforementioned second type that is simultaneously backward-compatible and forward-compatible. With regard to FIGS. 3A and 3B, the second type format may alternatively be referred to as a "current type version" or a variation thereof, since the referenced type is being utilized at receiving host 110 to validate a message based on the data contained in message file 205. More particularly, data from message file 205 is inserted into appropriate members or constructs of second type 305 to validate a message even if sending host 105 and receiving host 110 utilize different versions, or generations, of type 305.

Type 305 includes data members F1 310 and F2 315 for receiving data from message file 205. Data members F1 310 and F2 315 are structural constructs for receiving data used to validate a message in accordance with type 305 at receiving host 110. The data entity corresponding to the data to be received in data members F1 310 and F2 315 may be required or optional for validating a message in accordance with type 305. With regard to the present example, optional data refers to a known data entity that may or may not be required for a message to be validated.

If the data entity corresponding to the data to be received in data members F1 310 and F2 315 is required, type 305 is unable to validate a message if data for either of data members F1 310 and F2 315 is absent from message file 205. For instance, consider an example in which message file 205 is encoded in accordance with a first type at sending host 105. When message file 205 does not include data corresponding to data member F1 310 and/or data member F2 315, a message cannot be validated by type 305 at receiving host 110.

If a data entity corresponding to data for either of data members F1 310 and F2 315 is deemed to be optional, type 305 may tolerate an absence of such data and still validate a message at receiving host 110. That is, whether the first type by which message file is encoded at sending host 105 is the same or different than type 305 at receiving host 110, a message may be validated by type 305 at receiving host 110 when the data member corresponding to an optional data entity is empty.

If type 305 is described by an XML schema, an appropriate designation (e.g., "minOccurs=0") is made for an optional data entity corresponding to either of data members F1 310 and F2 315. More particularly, the designation indicates that an absent data element corresponding to the optional data entity may be tolerated. Otherwise, without such designation, it may be assumed that the data entity corresponding to data members F1 310 and F2 315 is required to validate a message in accordance with type 305.

Type 305 further includes constructs 320A and 320B for receiving data from message file 205. According to the example embodiments described herein, constructs contain a delimiter followed by an open element. More specifically, constructs 320A and 320B are structural constructs for receiving data used to validate a message based on message file 205, which is encoded in accordance with a first type that is a different version of type 305 utilized at receiving host 110. The different type may be either a preceding or subsequent version of type 305. To be both backward-compatible and forward-compatible, type 305 may include at least one construct 326A, which is unbounded with regard to a number of occurrences within type 305. Thus, construct 320A is able to have multiple constructs nested therein, including construct 320B, with each successive construct enabling the occurrence of at least a further construct. That is, an occurrence of a construct enables the occurrence of a subsequent construct, until a terminating sentry (i.e., an end delimiter) is detected.

The example of FIG. 3A includes two constructs 320A and 320B and is provided only as a non-limiting example. Rather, constructs 320A and 320B are provided to illustrate both the multi-generational, backward- and forward-compatible characteristics of type 305. Further, although the example of FIG. 3A shows constructs 320A and 320B at the end of type 305, a construct may be inserted at any place within a type that may accommodate a schema particle.

Constructs 320A and 320B may be alternately referred to as "placeholders." Construct 320A contains delimiter 325, followed by wildcard member 330; and construct 320B contains delimiter 335, followed by wildcard member 340. End delimiter 345 denotes an end to the wildcard members in message file 205. With regard to the present example, a wildcard member is a data member that receives data for an optional and/or unknown data entity that may be used to validate a message in accordance with type 305. Thus, a wildcard member is essentially an optional data member, although an optional data member is not necessarily a wildcard member.

Each of delimiters 325 and 335 is utilized as a sentry to validate the beginning of the respective construct. In addition, the delimiters render the respective constructs deterministic, particularly as they follow an optional data member, adhering to a fundamental principle for maintaining the determinism of an XML schema. Thus, when the data entity corresponding to data member F2 315 is optional, delimiter 325 renders construct 320A deterministic as construct 320A follows optional data member F2 315; and delimiter 325 further renders construct 320B deterministic as construct 320B follows wildcard member F3 330.

Each of the wildcard members 330 and 340 for the respective constructs may accept data from message file 205 that is optional data (i.e., from a known data entity) or wildcard data (i.e., from a data entity that is unknown by type 305). Further, each construct is to be appropriately annotated as being unbounded in the number of further constructs nested therein, dependent upon the amount of data contained in message file 205. End delimiter 345 denotes an end to wildcard members in message file 205.

Further to the example of type 305 in FIG. 3A, construct 320A includes delimiter 325 and wildcard member F3 330. The example contemplates message file 205 being encoded at sending host 105 in accordance with a first type, with the first type being a different version of the type 305 at receiving host 110. The different version of type 305 may be a version preceding or succeeding type 305 by one or more generations.

As set forth above, a wildcard member is an optional data member. Thus, wildcard member F3 330 is able to tolerate the absence of a data corresponding to a known data entity from message file 205, if such data entity has been deemed to be optional by type 305. Alternatively, wildcard member 330 is able to receive such optional data that is contained in message file 205.

Wildcard member F3 330 is also able to receive wildcard data from message file 205. That is, when message file 205 is encoded according to the first type at sending host 105, and the first type includes data corresponding to a data entity that is unknown to type 305 at receiving host 110, wildcard member F3 330 is able to receive data corresponding to the unknown data entity in order for type 305 to validate a message at receiving host 110.

Construct 320B, which is nested in construct 320A, is provided to receive further wildcard data from message file 205. Construct 320B includes delimiter 335 to maintain the deterministic character of type 305 since the preceding wildcard member F3 330 is also an optional data member. Wildcard member 340 is further provided to receive data corresponding to an unknown data entity in order for type 305 to validate a message at receiving host 110. In addition, construct 320B may have further constructs nested therein. That is, the occurrence of still further constructs may be enabled until a terminating sentry is detected.

Accordingly, receiving host 110 is able to receive message file 205 and validate a message in accordance with type 305, even if message file 205 is encoded in accordance with a different version of type 305. More particularly, a message may be validated in accordance with type 305 regardless of whether the different version of type 305 by which message file 205 is encoded precedes or succeeds type 305 by one or more generation.

FIG. 3B shows a detailed example of constructs 320A and 320B corresponding to type 305 in FIG. 3A. More specifically, FIG. 3B shows an example of an XML schema as type 305. FIG. 3B does not show schema elements for data members F1 310 and F2 315, since a description of such data members may be attributed to fundamental principles of XML that are known in the art. This example is not intended to be limiting in any manner, nor should any limitations be inferred from FIG. 3B.

It is first noted that XML is a tag-based language, and thus XML defines a strict tree structure or hierarchy. XML enables structured data to be described and exchanged in an open, text-based format. Further, XML utilizes the concepts of elements and namespaces. XML is a general-purpose language for representing structured data without including information that describes how to format the data for display. XML "elements" are structural constructs that consist of a start tag, an end or close tag, and the information or content that is contained between the tags. A "start tag" is formatted as "<tagname>" and an "end tag" is formatted as "</tagname>". In an XML message, start and end tags can be nested within other start and end tags. All elements that occur within a particular element must have their start and end tags occur before the end tag of that particular element. This defines a tree-like structure that is representative of the XML message. Each element forms a node in this tree, and potentially has "child" or "branch" nodes. The child nodes represent any XML elements that occur between the start and end tags of the "parent" node. Further, the unique particle attribution (UPA) principle advocates that each element in a message be attributed to only one schema tag.

In FIG. 3B, construct 320A is introduced by line 350 <xs:sequence minOccurs="0" maxOccurs="1" > indicating that the sequence that follows is optional, and may occur only once.

Line 355 <xs:element ref="beginLocal" minOccurs="1" maxOccurs="1"/> corresponds to delimiter 325 of construct 320A in FIG. 3A. The delimiter is called "beginLocal" and "ref" indicates that the delimiter is from a different namespace than the data that follows. Further, the delimiter may occur a minimum of one time and a maximum of one time.

Line 360 <xs:element name="v2LocalField" type="xs:int"/> indicates an element to be named "v2LocalField."

Line 365 <xs:sequence minOccurs="0" maxOccurs="unbounded"/> denotes optional member F3 of construct 320A, and indicates that the sequence that follows is optional (by "minOccurs=0") and may occur any number of times (by "maxOccurs=unbounded").

Line 370 <xs:element ref="beginLocal" minOccurs="1" maxOccurs="1"/> denotes delimiter 335 in construct 320B.

Line 375 <xs:any namespace="##targetNamespace ##local" minOccurs="0" maxOccurs="unbounded"/> corresponds to wildcard member 340 of construct 320B. The wildcard elements corresponding to "targetNamespace" are optional (by "minOccurs=0") and unbounded in the number of occurrences that are possible (by "maxOccurs=0"). Namespace ##targetNamespace denotes that the wildcard elements are in the namespace corresponding to the type. Namespace ##local denotes that the wildcard elements may corresponding to an empty namespace. It is further noted that construct 320B may not occur without the occurrence of construct 320A. That is, nested construct 320B may only occur after the occurrence of the preceding construct 320A.

Line 380 </xs:sequence> ends the sequence of nested constructs.

Line 385 <xs:element ref="endLocal" minOccurs="1" maxOccurs="1"/> corresponds to end delimiter 345 in FIG. 3A indicating the end of local namespace entries.

Line 390 </xs:sequence> ends the schema.

FIG. 3C shows sequence 307, which provides constructs further to the example of FIG. 3B. More specifically, the sequence of FIG. 3C allows elements from a target namespace or local namespace, which corresponds to sequence 305 from FIG. 3B. To be able to insert global elements, sequence 306 is provided. The constructs of sequence 306 are enabled in the same manner as the constructs of FIG. 3B.

By the example embodiments described above, a versionable schema is presented that is simultaneously backward- and forward-compatible with different versions of a schema. The versionable schema is able to tolerate the absence of optional data, and further accept wildcard data from unexpected versions of the schema. Thus, a message or message may be validated by inserting the received data into the versionable schema.

Figure 4:
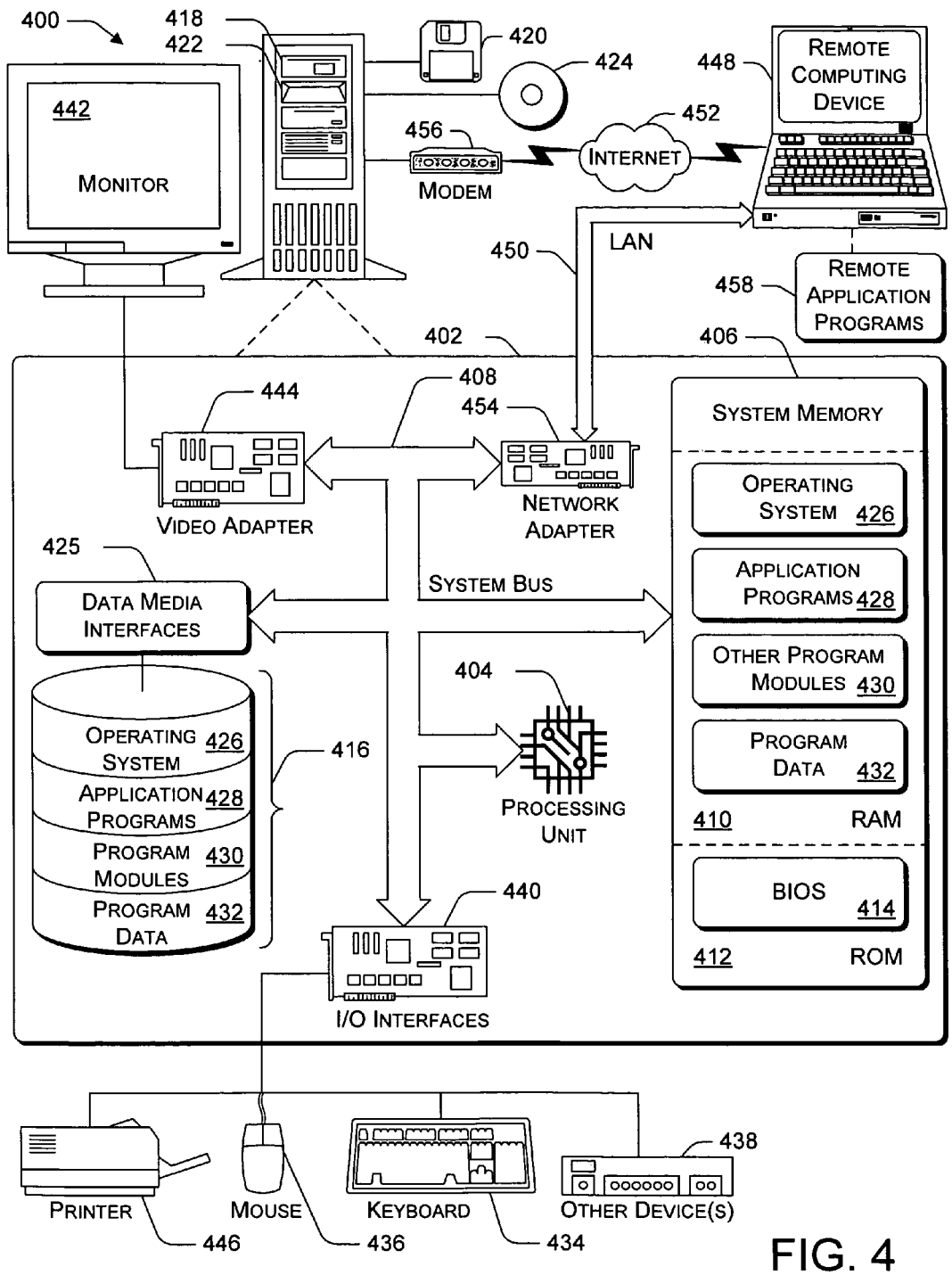
FIG. 4 illustrates a general computer network environment which can be used to implement the techniques described herein.

FIG. 4 illustrates a general computer environment 400, which can be used to implement the techniques described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the example computer environment 400.

Computer environment 400 includes a general-purpose computing device in the form of a computer 402. Sending host 105 and receiving host 110 for versioning types in accordance with the example embodiments described above may be included as various embodiments of computer 402. The components of computer 402 can include, but are not limited to, one or more processors or processing units 404, system memory 406, and system bus 408 that couples various system components including processor 404 to system memory 406.

System bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 402 may include a variety of computer readable media. Such media can be any available media that is accessible by computer 402 and includes both volatile and non-volatile media, removable and non-removable media.

System memory 406 includes computer readable media in the form of volatile memory, such as random access memory (RAM) 410; and/or non-volatile memory, such as read only memory (ROM) 412 or flash RAM. Basic input/output system (BIOS) 414, containing the basic routines that help to transfer information between elements within computer 402, such as during start-up, is stored in ROM 412 or flash RAM. RAM 410 typically contains data and/or program modules that are immediately accessible to and/or presently operated on by processing unit 404.

Computer 402 may also include other removable/non-removable, volatile/non-volatile computer storage media. By way of example, FIG. 4 illustrates hard disk drive 416 for reading from and writing to a non-removable, non-volatile magnetic media (not shown), magnetic disk drive 418 for reading from and writing to removable, non-volatile magnetic disk 420 (e.g., a "floppy disk"), and optical disk drive 422 for reading from and/or writing to a removable, non-volatile optical disk 424 such as a CD-ROM, DVD-ROM, or other optical media. Hard disk drive 416, magnetic disk drive 418, and optical disk drive 422 are each connected to system bus 408 by one or more data media interfaces 425. Alternatively, hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, removable magnetic disk 420, and removable optical disk 424, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 416, magnetic disk 420, optical disk 424, ROM 412, and/or RAM 410, including by way of example, operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as keyboard 434 and a pointing device 436 (e.g., a "mouse"). Other input devices 438 (not shown specifically) may include a microphone, joystick, game pad, satellite dish, serial port, scanner, and/or the like. These and other input devices are connected to processing unit 404 via input/output interfaces 440 that are coupled to system bus 408, but may be connected by other interface and bus structures, such as a parallel port, game port, or a universal serial bus (USB).

Monitor 442 or other type of display device can also be connected to the system bus 408 via an interface, such as video adapter 444. In addition to monitor 442, other output peripheral devices can include components such as speakers (not shown) and printer 446 which can be connected to computer 402 via I/O interfaces 440.

Computer 402 can operate in a networked environment using logical connections to one or more remote computers, such as remote computing device 448. By way of example, remote computing device 448 can be a PC, portable computer, a server (such as server device 105), a router, a network computer, a peer device or other common network node, and the like. Remote computing device 448 is illustrated as a portable computer that can include many or all of the elements and features described herein relative to computer 402. Alternatively, computer 402 can operate in a non-networked environment as well.

Logical connections between computer 402 and remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, computer 402 is connected to local network 450 via network interface or adapter 454. When implemented in a WAN networking environment, computer 402 typically includes modem 456 or other means for establishing communications over wide network 452. Modem 456, which can be internal or external to computer 402, can be connected to system bus 408 via I/O interfaces 440 or other appropriate mechanisms. It is to be appreciated that the illustrated network connections are examples and that other means of establishing at least one communication link between computers 402 and 448 can be employed.

In a networked environment, such as that illustrated with computing environment 400, program modules depicted relative to computer 402, or portions thereof, may be stored in a remote memory storage device. By way of example, remote application programs 458 reside on a memory device of remote computer 448. For purposes of illustration, applications or programs and other executable program components such as the operating system are illustrated herein as discrete blocks, although it is recognized that such programs and components reside at various times in different storage components of computing device 402, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. A computer-readable storage medium having stored thereon a data structure described by an XML schema for receiving data formatted in accordance with a first version of the data structure and for presenting the received data in an arrangement defined by the data structure for validation by a device using a current version of the data structure, the data structure comprising:

at least one optional data member described in the XML schema to render the received data functional within the current version of the data structure when optional data is absent from the received data, wherein an optional nature of the at least one optional data member is designated in the XML schema;

at least one construct of a first type described in the XML schema to render the received data functional within the current version of the data structure when the received data includes an unknown data entity that is not specified by the current version of the data structure, wherein a limitation on a number of occurrences of the at least one construct of the first type and a specification of the at least one construct of the first type is defined in the XML schema;

at least one construct of a second type described in the XML schema to render the received data functional within the current version of the data structure when the received data includes an optional data entity that is specified by the current version of the data structure, wherein the at least one construct of the second type tolerates an absence of the optional data entity in rendering the received data functional within the current version of the data structure, wherein a limitation on a number of occurrences of the at least one construct of the second type and a specification of the tolerance of the absence of the optional data entity of the at least one construct of the second type is defined in the XML schema; and wherein, the at least one optional data member, the at least one construct of the first type and the at least one construct of the second type of the data structure are for receiving data formatted in accordance with the first version and for presenting the received data in an arrangement defined by the data structure for validation by the device using the current version, wherein the received data comprises data received in a Service Oriented Architecture (SOA).

2. The computer-readable storage medium according to claim 1, wherein the first version is one of plurality of versions, the plurality of versions comprising versions predating and postdating the current version.

3. The computer-readable storage medium according to claim 1, wherein the at least one construct of the first type includes a delimiter followed by a wildcard data member, wherein the delimiter and a limitation on a number of occurrences of the delimiter is described in the XML schema.

4. A computer-readable storage medium having stored thereon a data structure described by an XML schema for receiving data formatted in accordance with a first version of the data structure and for presenting the received data in an arrangement defined by the data structure for validation by a device using a current version of the data structure, the data structure comprising:

at least one optional data member described in the XML schema to render the received data functional within the current version of the data structure when optional data is absent from the received data, wherein an optional nature of the at least one optional data member is designated in the XML schema;

at least one construct described in the XML schema to render the received data functional within the current version of the data structure when the received data includes wildcard data that is not specified by the current version of the data structure, wherein a limitation on a number of occurrences of the at least one construct and a specification of the at least one construct is defined in the XML schema;

a delimiter which acts as a sentry to validate a beginning of the construct, wherein the delimiter and a limitation on a number of occurrences of the delimiter is described in the XML schema;

at least one wildcard member described in the XML schema that follows the delimiter to receive wildcard data received in accordance with a different version of the data structure, wherein a limitation on a number of occurrences of the wildcard member and a specification of the wildcard member is defined in the XML schema; and wherein, the at least one optional data member, the at least one construct, and the at least one wildcard member of the data structure are for receiving data formatted in accordance with the first version and for presenting the received data in an arrangement defined by the data structure for validation by the device using the current version, whereby the received data comprises data received in a Service Oriented Architecture (SOA).

5. The computer-readable storage medium according to claim 4, wherein the first version is one of plurality of versions, the plurality of versions comprising versions predating and postdating the current version.

6. The computer-readable storage medium according to claim 4, wherein the different version of the data structure is one of an earlier version of the data structure and a later version of the data structure.

7. The computer-readable storage medium according to claim 4, wherein a last occurrence of the at least one wildcard member is followed by an end delimiter, wherein the end delimiter and a limitation on a number of occurrences of the end delimiter is described in the XML schema.

8. The computer-readable storage medium according to claim 4, wherein the at least one wildcard member is to be placed in a location for a schema particle.

9. The computer-readable storage medium according to claim 8, wherein a schema particle is any one of a group consisting of an element, a compositor, a group, or an element wildcard.

10. The computer-readable storage medium according to claim 8, wherein the at least one wildcard member is to receive wildcard data that is any one of a group consisting of a target namespace, a local namespace, or a global namespace.

11. A computer-readable storage medium having stored thereon one or more instructions to be executed by one or more processors, the one or more instructions causing the one or more processors to implement a method, the method comprising:

receiving data common to multiple generations of type, wherein the type refers to a format of a message file which enables a message to be encoded or decoded in a valid manner;

overcoming compatibility issues between a current generation of the type and other multiple generations of the type, the overcoming compatibility issues comprising:

tolerating an absence of optional data from the received data, when the data is received in accordance with a different generation of the type, wherein the optional data comprises a data element known by and deemed optional by the current generation of the type, wherein an optional nature of the optional data is designated in the XML schema;

specifying, in the current generation of the type, a maximum number of times optional data is allowed to appear in the received data, wherein the maximum number of times optional data is allowed to appear in the received data is specified in the XML schema;

accepting an inclusion of extra data in the received data, when the data is received in accordance with another different generation of the type, wherein the extra data comprises a data element unknown by the current generation of the type;

specifying, in the current generation of the type, a maximum number of times extra data is allowed to appear in the received data, wherein the maximum number of times extra data is allowed to appear in the received data is specified in the XML schema; and formatting the received data according to the current generation of the type into a message; and validating a message by inserting data elements in the received data into a data structure of the current generation of the type, whereby the received data comprises data received in a Service Oriented Architecture (SOA).

12. The computer-readable storage medium according to claim 11, wherein the type is described by an XML schema.

13. The computer-readable storage medium according to claim 11, wherein the tolerating comprises detecting no data element in an optional element member for a message.

14. The computer-readable storage medium according to claim 11, wherein the accepting comprises receiving the extra data in a placeholder for a message.

15. The computer-readable storage medium according to claim 11, wherein the current generation of the type includes at least one optional element member and at least one placeholder.

16. The computer-readable storage medium according to claim 14, wherein the at least one placeholder includes a delimiter followed by an element member to receive the extra data, wherein the delimiter and a limitation on a number of occurrences of the delimiter is described in the XML schema.

17. The computer-readable storage medium according to claim 14, wherein the at least one placeholder is to receive the further data that is any one of a group consisting of a target namespace, a local namespace, or a global namespace.

18. A computer implemented method, comprising:
receiving data in accordance with different type versions, where each of the different type versions uses a different arrangement of data within a message file to enable encoding and decoding of the received data;
overcoming compatibility issues between a current type version and other different type version, the overcoming compatibility issues comprising:
tolerating optional data missing from the received data, when the data is received according to a different type version, wherein an optional nature of optional data and a specification of a limitation on a number of occurrences of optional data is designated in an XML schema;
accepting further data included in the received data, when the data is received according to another different type version;
specifying, in the current type version, a maximum number of times further data is allowed to appear in the received data, wherein the maximum number of times further data is allowed to appear in the received data is specified in the XML schema; and
formatting the received data according to the current type version into a message; and
validating messages by inserting the received data into a data structure which allows the messages to be validated by the different type versions, whereby the computer implemented method is implementable in a Service Oriented Architecture (SOA).

19. The computer implemented method according to claim 18, wherein the further data includes the optional data.

20. The computer implemented method according to claim 18, wherein the type is described using the XML schema.

21. The computer implemented method according to claim 18, wherein the tolerating comprises allowing an absent data element in an optional data member in order to validate a message.

22. The computer implemented method according to claim 18, wherein the accepting comprises accepting the further data in a placeholder in order to validate a message.

23. The computer implemented method according to claim 18, wherein the current type version includes at least one optional data member and at least one placeholder.

24. The computer implemented method according to claim 22, wherein the at least one placeholder includes a delimiter followed by a wildcard element to receive the further data according to the another different type version, wherein further a last placeholder is followed by an end delimiter, wherein the delimiter and the end delimiter and a limitation on a number of occurrences of the delimiter and the end delimiter are described in the XML schema.

25. The computer implemented method according to claim 22, wherein the at least one placeholder is to accept the further data that is any one of a group consisting of a target namespace, a local namespace, and a global namespace.

26. A computing device, comprising:
one or more processors;
one or more memories;
instructions stored on at least one or more memories and executed by at least one of the one or more processors to perform acts, the acts comprising:
receiving data according to multiple different generations of type, where each different generation of type uses a different arrangement of data within a message file to enable encoding and decoding of the received data;
overcoming compatibility issues between a current generation of type and other multiple different generations of type, the overcoming compatibility issues comprising:
tolerating optional data being absent from the received data, when the data is received according to a different generation of the type, wherein an optional nature of optional data and a specification of a limitation on a number of occurrences of optional data is designated in an XML schema;
accepting further data in the received data, when the data is received according to another different generation of the type, wherein the accepting further data is facilitated by at least one construct member having a delimiter followed by a wild card data member, wherein the delimiter, a limitation on a number of occurrences of the delimiter and a specification a limitation on a number of occurrences of further data is designated in the XML schema; and
formatting the received data according to the current generation of type into a message;
validating messages by inserting the received data into a data structure which allows the messages to be validated by the multiple different generations of type, wherein the computing device is configured to operate in an environment that comprises a Service Oriented Architecture (SOA).

27. The computing device according to claim 26, wherein the type is described by the XML schema.

28. The computing device according to claim 26, wherein the further data is placed in a location for a schema particle.

29. The computing device according to claim 28, wherein the schema particle is any one of a group consisting of an element, a compositor, a group, or an element wildcard.

30. The computing device according to claim 28, wherein the accepting further data is to accept data that is any one of a group consisting of a target namespace, a local namespace, or a global namespace.

* * * * *